United States Patent
Garcia Rodriguez et al.

(10) Patent No.: US 12,250,030 B2
(45) Date of Patent: Mar. 11, 2025

(54) SPATIAL REUSE FOR HIDDEN NODE SCENARIO

(71) Applicant: Nokia Technologies Oy, Espoo (FI)

(72) Inventors: Adrian Garcia Rodriguez, Santa Cruz de Tenerife (ES); David Lopez-Perez, Blanchardstown (IE); Lorenzo Galati Giordano, Stuttgart (DE); Olli Alanen, Vantaa (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/633,903

(22) PCT Filed: Aug. 30, 2019

(86) PCT No.: PCT/FI2019/050619
§ 371 (c)(1),
(2) Date: Feb. 8, 2022

(87) PCT Pub. No.: WO2021/038122
PCT Pub. Date: Mar. 4, 2021

(65) Prior Publication Data
US 2022/0294493 A1    Sep. 15, 2022

(51) Int. Cl.
*H04B 7/02* (2018.01)
*H04B 7/024* (2017.01)
(Continued)

(52) U.S. Cl.
CPC .......... *H04B 7/024* (2013.01); *H04B 7/043* (2013.01); *H04W 16/28* (2013.01)

(58) Field of Classification Search
CPC ........ H04B 7/024; H04B 7/043; H04W 16/28
(Continued)

(56) References Cited

U.S. PATENT DOCUMENTS

2010/0195527 A1* 8/2010 Gorokhov ............ H04B 7/0417
    370/252
2016/0261315 A1* 9/2016 Fujishiro ................ H04B 7/024
(Continued)

FOREIGN PATENT DOCUMENTS

WO    WO-2009050628 A1 *  4/2009    ........ H04W 74/0816
WO    2018/136254 A1    7/2018
(Continued)

OTHER PUBLICATIONS

"IEEE 802.11", Wikipedia, Retrieved on Feb. 7, 2022, Webpage available at : https://en.wikipedia.org/wiki/IEEE_802.11.
(Continued)

*Primary Examiner* — Kevin M Burd
(74) *Attorney, Agent, or Firm* — Joseph C. Drish; McCarter & English, LLP

(57) ABSTRACT

This document discloses a solution for enabling spatial cooperation in a hidden node scenario. According to an aspect, a method comprises: detecting, by a station of a first wireless network managed by a first access node, that a second access node of a second wireless network is hidden to the first access node; in response to the detecting, transmitting by the station a spatial cooperation request message to the second access node; receiving, by the station from the second access node as a response to the spatial cooperation request message, a spatial cooperation response message comprising at least one information element acknowledging spatial cooperation; after receiving the spatial cooperation response message, receiving by the station a frame from the first access node while the second access node is transmitting another frame and while null steering is performed between the apparatus and the second access node.

26 Claims, 7 Drawing Sheets

(51) Int. Cl.
*H04B 7/0426* (2017.01)
*H04W 16/28* (2009.01)

(58) Field of Classification Search
USPC .......................................................... 375/262
See application file for complete search history.

(56) References Cited

U.S. PATENT DOCUMENTS

2018/0263045 A1* 9/2018 Zhou ..................... H04W 72/12
2020/0229099 A1* 7/2020 He ..................... H04W 72/1268

FOREIGN PATENT DOCUMENTS

| WO | 2020/178302 A1 | 9/2020 |
| WO | 2020/225473 A1 | 11/2020 |
| WO | 2020/225474 A1 | 11/2020 |

OTHER PUBLICATIONS

International Search Report and Written Opinion received for corresponding Patent Cooperation Treaty Application No. PCT/FI2019/050619, dated Oct. 24, 2019, 11 pages.

Montemurro, "EHT Closing Report—Mar. 2019", IEEE 802.11-19/0507r, Mar. 13, 2019, 4 pages.

Chen et al.,"Discussions on the PHY features for EHT", IEEE 802.11-18/1461r0, Sep. 9, 2018, pp. 1-20.

Yang et al., "Next Generation PHY/MAC in Sub-7GHz", IEEE 802.11-18/0846r2, May 10, 2018, pp. 1-21.

"IEEE Standard for Information Technology—Telecommunications and Information Exchange between Systems Local and Metropolitan Area Networks Specific Requirements, Part 11: Wireless LAN Medium Access Control (MAC) and Physical Layer (PHY) Specifications", IEEE Computer Society, IEEE Std 802.11ax™-2021, Feb. 9, 2021, 767 pages.

* cited by examiner

SPATIAL REUSE FOR HIDDEN NODE SCENARIO

FIELD

Various embodiments described herein relate to the field of wireless communications and, particularly, to sharing a transmission opportunity between wireless devices in a hidden node situation.

BACKGROUND

Constant demand of higher throughput and capacity and density of various wireless networks sets a demand for improving spectral efficiency. Beamforming is a technique where a transmitter focuses radio energy towards an intended recipient and/or reduces radio energy towards an unintended recipient. The benefit may be improved link quality and/or reduced interference towards other radio receivers, as well as an improved spatial reuse.

A hidden node situation refers to a scenario where a first wireless device is communicating with a second wireless device in a situation where a third wireless device is present such that the second device cannot detect the third device but the first device can detect the third device. In such a situation, the third device may carry out a transmission when the second device is transmitting a frame to the first device. As a consequence, the transmissions by the second device and the third device may collide, and the first device cannot receive the frame from the second device.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a first wireless network managed by a first access node, comprising means for performing: detecting that a second access node of a second wireless network is hidden to the first access node; in response to the detecting, transmitting a spatial cooperation request message to the second access node; receiving, from the second access node as a response to the spatial cooperation request message, a spatial cooperation response message comprising at least one information element acknowledging spatial cooperation; after receiving the spatial cooperation response message, receiving a frame from the first access node while the second access node is transmitting another frame and while null steering is performed between the apparatus and the second access node.

In an embodiment, the means are configured to transmit, to the second access node before receiving the frame from the first access node, a null coordination frame comprising at least one information element requesting for null steering between the apparatus and the second access node.

In an embodiment, the at least one information element of the null coordination frame requests for the second access node to arrange a transmission null towards the apparatus.

In an embodiment, the means are configured, in response to detecting that the first access node is intending to transmit the frame to the apparatus, to request for the second access node to arrange the transmission null towards the apparatus.

In an embodiment, the means are configured to cause the apparatus to perform the null steering by arranging a reception null towards the second access node.

In an embodiment, the means are configured to, in response to detecting that the second access node is intending to transmit a frame, to arrange the reception null towards the second access node.

In an embodiment, the means are configured to perform channel measurements on a channel sounding signal received from the second access node before receiving the frame and to configure the reception null on the basis of the channel measurements.

In an embodiment, the channel sounding signal is addressed to an apparatus other than the apparatus.

In an embodiment, the means are configured to transmit, to the first access node after receiving the spatial cooperation response message, a spatial cooperation information frame comprising at least one information element indicating spatial cooperation between the apparatus and the second access node.

In an embodiment, the means are configured to receive, before receiving the frame from the first access node, a trigger frame from the second access node, and to transmit to the second access node a response message responding to the trigger frame and also informing the first access node of the null steering during the reception of the frame.

In an embodiment, the means are configured to receive, before receiving the frame from the first access node, a first null placement request frame from the first access node and to transmit, to the second access node in response to the reception of the first null placement request frame, a second null placement request frame requesting the second access node to arrange a transmission null towards the apparatus.

According to an aspect, there is provided an apparatus for a first access node of a first wireless network, comprising means for performing: receiving a spatial cooperation request message from a first station associated to a second access node of a second wireless network; transmitting, to the first station as a response to the spatial cooperation request message, a spatial cooperation response message comprising at least one information element acknowledging spatial cooperation; after transmitting the spatial cooperation response message, transmitting a frame to a second station associated to the first access node while the second access node is transmitting another frame to the first station and while null steering is performed between the apparatus and the first station.

In an embodiment, the means are configured to receive, from the first station before the second access node transmits said another frame, a null coordination frame comprising at least one information element requesting for null steering between the apparatus and the first station.

In an embodiment, the at least one information element of the null coordination frame requests for the apparatus to arrange a transmission null towards the first station.

In an embodiment, the means are configured to, as a response to the null coordination frame, to transmit a channel sounding signal.

In an embodiment, the channel sounding signal is addressed to the second station.

In an embodiment, the means are configured to transmit a trigger frame before transmitting the frame to the second station, and to receive from the first station a response message responding to the trigger frame.

In an embodiment, the means comprises: at least one processor; and at least one memory including computer program code, the at least one memory and computer program code configured to, with the at least one processor, cause the performance of the apparatus.

According to an aspect, there is provided a method comprising: detecting, by a station of a first wireless network managed by a first access node, that a second access node of a second wireless network is hidden to the first access node; in response to the detecting, transmitting by the station a spatial cooperation request message to the second access node; receiving, by the station from the second access node as a response to the spatial cooperation request message, a spatial cooperation response message comprising at least one information element acknowledging spatial cooperation; after receiving the spatial cooperation response message, receiving by the station a frame from the first access node while the second access node is transmitting another frame and while null steering is performed between the apparatus and the second access node.

In an embodiment, the station transmits, to the second access node before receiving the frame from the first access node, a null coordination frame comprising at least one information element requesting for null steering between the station and the second access node.

In an embodiment, the at least one information element of the null coordination frame requests for the second access node to arrange a transmission null towards the station.

In an embodiment, the station requests, in response to detecting that the first access node is intending to transmit the frame to the station, for the second access node to arrange the transmission null towards the apparatus.

In an embodiment, the station performs the null steering by arranging a reception null towards the second access node.

In an embodiment, the station arranges the reception null towards the second access node in response to detecting that the second access node is intending to transmit a frame.

In an embodiment, the station performs channel measurements on a channel sounding signal received from the second access node before receiving the frame and configures the reception null on the basis of the channel measurements.

In an embodiment, the channel sounding signal is addressed to a station other than the station.

In an embodiment, the station transmits, to the first access node after receiving the spatial cooperation response message, a spatial cooperation information frame comprising at least one information element indicating spatial cooperation between the station and the second access node.

In an embodiment, the station receives, before receiving the frame from the first access node, a trigger frame from the second access node, and transmits to the second access node a response message responding to the trigger frame and also informing the first access node of the null steering during the reception of the frame.

In an embodiment, the station receives, before receiving the frame from the first access node, a first null placement request frame from the first access node and transmits, to the second access node in response to the reception of the first null placement request frame, a second null placement request frame requesting the second access node to arrange a transmission null towards the station.

According to an aspect, there is provided a method comprising: receiving, by a first access node of a first wireless network, a spatial cooperation request message from a first station associated to a second access node of a second wireless network; transmitting, by the first access node to the first station as a response to the spatial cooperation request message, a spatial cooperation response message comprising at least one information element acknowledging spatial cooperation; after transmitting the spatial cooperation response message, transmitting by the first access node a frame to a second station associated to the first access node while the second access node is transmitting another frame to the first station and while null steering is performed between the first access node and the first station.

In an embodiment, the first access node receives, from the first station before the second access node transmits said another frame, a null coordination frame comprising at least one information element requesting for null steering between the first access node and the first station.

In an embodiment, the at least one information element of the null coordination frame requests for the first access node to arrange a transmission null towards the first station.

In an embodiment, the first access node transmits a channel sounding signal as a response to the null coordination frame.

In an embodiment, the channel sounding signal is addressed to the second station.

In an embodiment, the means are configured to transmit a trigger frame before transmitting the frame to the second station, and to receive from the first station a response message responding to the trigger frame 30 to 34.

According to an aspect, there is provided a computer program product embodied on a computer-readable medium and comprising a computer program code readable by a computer for an apparatus of a first wireless network managed by a first access node, wherein the computer program code configures the computer to carry out a computer process comprising: detecting that a second access node of a second wireless network is hidden to the first access node; in response to the detecting, causing transmission of a spatial cooperation request message to the second access node; receiving, from the second access node as a response to the spatial cooperation request message, a spatial cooperation response message comprising at least one information element acknowledging spatial cooperation; after receiving the spatial cooperation response message, receiving a frame from the first access node while the second access node is transmitting another frame and while null steering is performed between the apparatus and the second access node.

According to an aspect, there is provided a computer program product embodied on a computer-readable medium and comprising a computer program code readable by a computer for a first access node of a first wireless network, wherein the computer program code configures the computer to carry out a computer process comprising: receiving a spatial cooperation request message from a first station associated to a second access node of a second wireless network; transmitting, to the first station as a response to the spatial cooperation request message, a spatial cooperation response message comprising at least one information element acknowledging spatial cooperation; after transmitting the spatial cooperation response message, transmitting a frame to a second station associated to the first access node while the second access node is transmitting another frame to the first station and while null steering is performed between the first access node and the first station.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
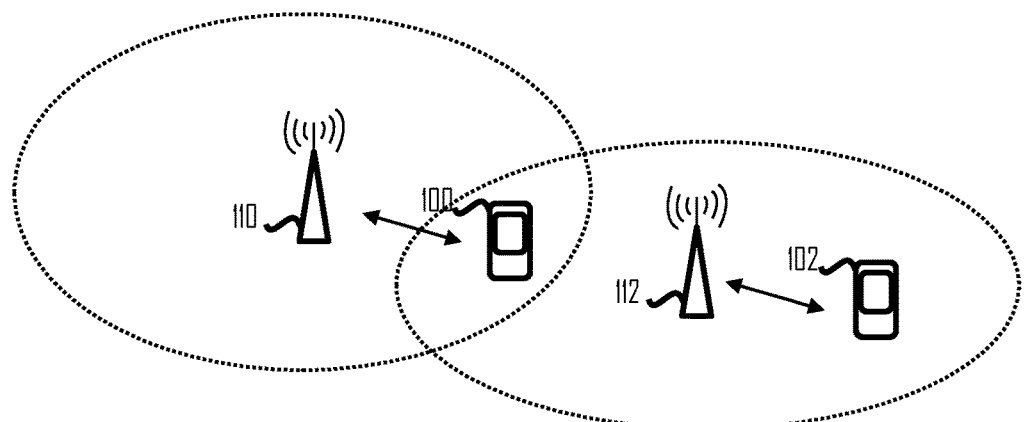

A general wireless communication scenario to which embodiments of the invention may be applied is illustrated in FIG. 1. FIG. 1 illustrates wireless communication devices comprising a plurality of access points (AP) 110, 112 and a plurality of wireless terminal devices or stations (STA) 100 to 102. Each AP may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP, and a general term for an apparatus managing a wireless network such as the BSS and providing the stations with wireless services is an access node. The APs 110, 112 may also provide access to other networks, e.g. the Internet. In another embodiment, the BSS may comprise a plurality of APs to form an extended service set (ESS), e.g. the AP 110 or 112 may belong to the same ESS with another AP and have the same service set identifier (SSID). While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

IEEE 802.11 specifications specify a data transmission mode that includes a primary channel and secondary channels. The primary channel is used in all data transmissions and, in addition to the primary channel, one or more secondary channels may be employed for additional bandwidth. The transmission band of a BSS may contain the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel.

Some IEEE 802.11 networks employ channel contention based on carrier sense multiple access with collision avoidance (CSMA/CA) for channel access. Every device attempting to gain a TXOP is reducing a backoff value while the primary channel is sensed to be idle for a certain time interval. The backoff value may be selected randomly within a range defined by a contention window parameter. The contention window may have different ranges for different types of traffic, thus affecting priority of the different types of traffic. The channel sensing may be based on sensing a level of radio energy in the radio channel. The sensed level may be compared with a threshold: if the sensed level is below the threshold level, the channel may be determined to be idle (otherwise busy). Such a procedure is called clear channel assessment (CCA) in 802.11 specifications. When the backoff value reaches zero, the STA gains the TXOP and starts frame transmission. If another STA gains the TXOP before that, the backoff value computation may be suspended, and the STA continues the backoff computation after the TXOP of the other STA has ended and the primary channel is sensed to be idle. The time duration (the backoff value) may not be decremented during the TXOP of the other STA, but the time duration that already lapsed before the suspension may be maintained, which means that the device now has a higher probability of gaining the TXOP. A secondary channel may be used in the transmission if it has been free for a determined time period (may be the same or different time period than that used for gaining the TXOP) just before TXOP start time in order for the contending device to take the secondary channel in use.

The STA 100 to 102 may be considered to be a terminal device or a station capable of connecting or associating to any one of the APs 110, 112. The STA may establish a connection with any one of APs it has detected to provide a wireless connection within the neighbourhood of the STA. The connection establishment may include authentication in which an identity of the STA is established in the AP. The authentication may comprise setting up an encryption key used in the BSS. After the authentication, the AP and the STA may carry out association in which the STA is fully registered in the BSS, e.g. by providing the STA with an association identifier (AID). A separate user authentication may follow association, which may also comprise building an encryption key used in the BSS. It should be noted that in other systems terms authentication and association are not necessarily used and, therefore, the association of the STA to an AP should be understood broadly as establishing a connection between the STA and the AP such that the STA is in a connected state with respect to the AP and waiting for downlink frame transmissions from the AP and monitoring its own buffers for uplink frame transmissions. A STA not associated to the AP is in an unassociated state. An unassociated STA may still exchange some frames with the AP, e.g. discovery frames.

For the sake of the following description, let us assume a situation where the station 100 is associated to the access node 110 while the station 102 is associated to the access node 112. Further, the access nodes 110, 112 manage different wireless networks having different network identifiers, e.g. different SSIDs. FIG. 1 illustrates coverage areas of the respected networks. Station 102 is located within the coverage area of the access node 112 while the station 100 is located within the coverage area of both access nodes 110, 112. Furthermore, the access nodes 110, 112 are not within one another's coverage area which may mean that the access nodes cannot detect one another or communicate with one another. It means that the access node 112 is a potential source of interference to the station 100 and a hidden node for the access node 110. In other words, if the access node 110 transmits a frame to the station 100 while the access node 112 is transmitting another frame to the station 102, the two frame transmissions may collide at the station 100, and the station 100 cannot detect the frame transmitted by the access node 110. The access nodes 110, 112 may be unable to remedy the hidden node problem because they cannot communicate with one another.

The access nodes 110, 112 may comprise an antenna array that enables beamforming. As known in the art, beamforming or spatial filtering is a signal processing technique used for directional signal transmission or reception. The spatial filtering is achieved by combining signals in the antenna array in such a way that signals transmitted to particular angles experience constructive interference while signals transmitted to other angles experience destructive interference. Beamforming can be used at both the transmitting and receiving ends in order to achieve spatial selectivity. The improvement is directivity of radio signal to desired directions and reduction in the emitted radio energy to undesired directions. The stations 100, 102 may also comprise an antenna array comprising at least two antennas. The number of antennas in the access nodes may be two or more.

Null steering is a beamforming technique where a transmission null is directed to the undesired directions. For example, the access node 112 may try to steer a transmission null towards the station 100. The null steering may equally be used in reception by steering a reception null towards a direction where undesired signals may be expected. For example, the station 100 comprising the antenna array may direct a reception null towards the access node 102. Thus, such undesired signals will not interfere with reception of signals from desired direction(s). Effective use of null steering would require channel state information on a radio channel between the access node 112 and the station 100. Since the station 102 is in an unassociated state with respect to the access node 112, the access node 112 may not acquire the channel state information directly from the station 102. The same applies to the station with respect to acquiring the channel state information from the access node 102.

The null steering may be used to enable concurrent transmissions in neighbouring wireless networks. For example, the access node 112 may direct a transmission null towards the station 100 to enable the access nodes 110, 112 to transmit one or more downlink frames concurrently on the same frequency channel. The transmission null ensures that the transmission by the access node 112 will not interfere the station 100, and the station 100 may receive a downlink frame from the access node 110.

Figure 2:
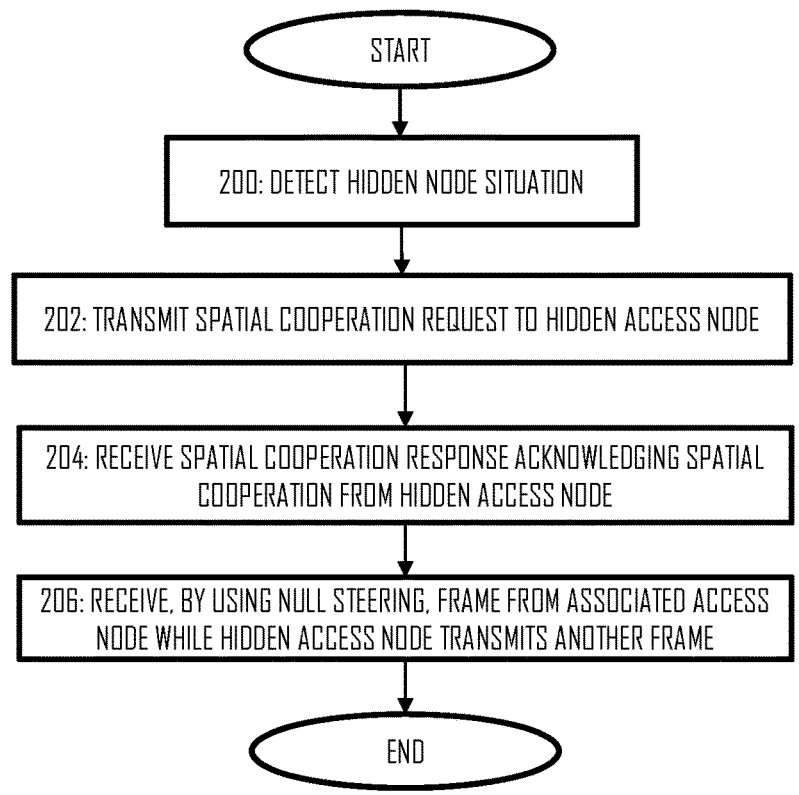
FIGS. 2 and 3 illustrate some embodiments of processes for arranging spatial cooperation between a station and a hidden access node.
Figure 3:
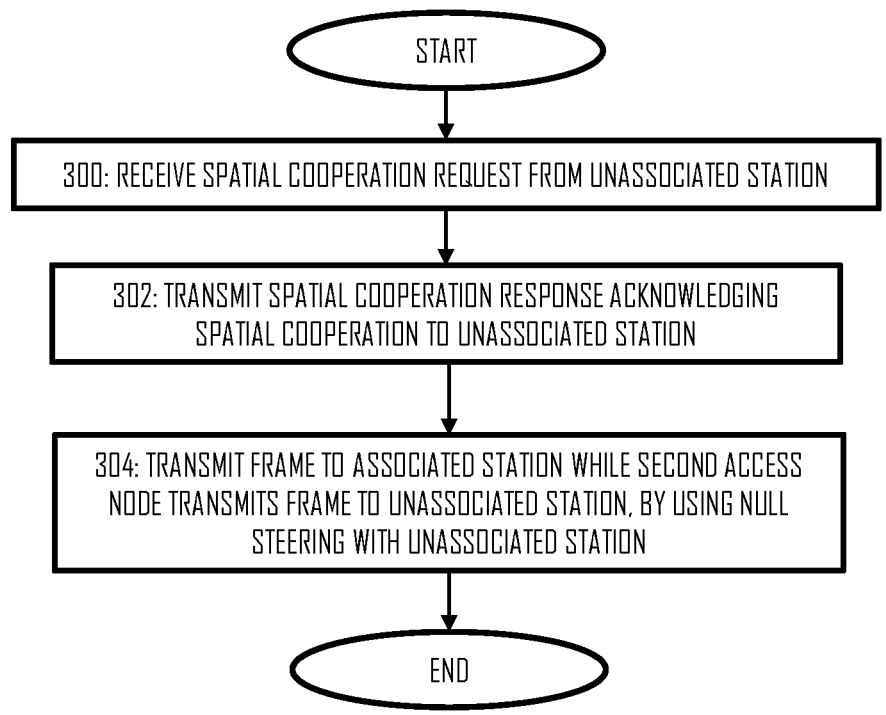

FIGS. 2 and 3 illustrate processes according to some embodiments for performing inter-network beamforming cooperation and sharing a TXOP between two access nodes. FIG. 2 illustrates a process executed in the station 100, while FIG. 3 illustrates a process executed in the access node 102.

Referring to FIG. 2, let us describe a process for a station of a first wireless network managed by a first access node, e.g. one the access node 110. The process comprises: detecting (block 200) that a second access node 112 of a second wireless network is hidden to the first access node 110; in response to the detecting, transmitting (block 202) a spatial cooperation request message to the second access node 112; receiving (block 204), from the second access node 112 as a response to the spatial cooperation request message, a spatial cooperation response message comprising at least one information element acknowledging spatial cooperation; after receiving the spatial cooperation response message, receiving (block 206) a frame from the first access node 110 while the second access node 112 is transmitting another frame and while null steering is performed between the apparatus and the second access node 112.

Referring to FIG. 3, let us describe a corresponding procedure for an apparatus for the access node 112. The process comprises: receiving (300) the spatial cooperation request message from the station 100 associated to the access node 110; transmitting (block 302), to the station 100 as a response to the spatial cooperation request message, the spatial cooperation response message comprising the at least one information element acknowledging the spatial cooperation; after transmitting the spatial cooperation response message, transmitting (block 304) a frame to the station 102 associated to the access node 112 while the access node 110 is transmitting another frame to the station 100 and while null steering is performed between the apparatus and the station 100.

The above-described methods provide an advantage in that spatial cooperation between the two access nodes 110, 112 can be arranged even in a situation where the access nodes 110, 112 cannot communicate with one another. Since the two frames can be transmitted simultaneously with a collision in the station 100, spectral efficiency can be improved.

The above-described procedures relate to the scenario illustrated in FIG. 1. However, the hidden node situation may appear in another context, e.g. in a peer-to-peer network where one peer device is hidden to another peer device. Other scenarios can also be envisaged.

The above-described embodiments are applicable to a situation where the station 100 is associated to the access node 110 and in an unassociated state to the access node 112, but can also be applied to a situation where the station is in an unassociated state to the access node 110. For example, the station 100 may arrange the spatial cooperation for receiving a broadcast signal such as a beacon signal from the access node 110, or for receiving an association establishment frame such as an association response frame from the access node 110.

Figure 4:
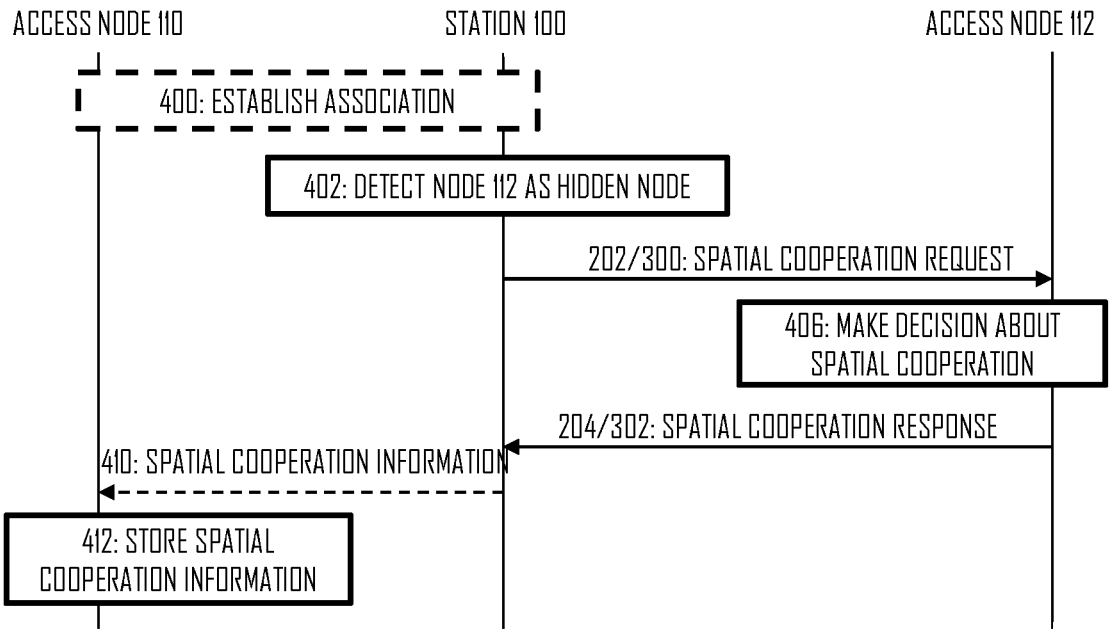
FIG. 4 illustrates an embodiment for setting up spatial cooperation with a hidden access node.

In an embodiment, the spatial cooperation message sets up the spatial cooperation between the two wireless networks. In other words, the transmission of the spatial cooperation request and associated response may precede transmission of any frames that are transmitted under the spatial cooperation and null steering with respect to the station 100. FIG. 4 illustrates an embodiment of such a procedure for setting up the spatial cooperation.

Referring to FIG. 4, the station 100 may associate to the access node in block 400. Block 400 is optional, as described above. The association may be carried out according to the association establishment procedure described above. In block 402, the station 100 detects the hidden node situation where the access node 112 is hidden from the access node 110. There are a variety of methods for identifying hidden node problems. For example, in a simple implementation, the station 100 may detect that the access node 112 is to the access node 110 based on past information, e.g. detection of a situation where the station 100 detects a transmission from the access node 112 and, simultaneously the access node 110 commences a downlink transmission towards the station 100. In this situation, the downlink transmission from the access node 110 may collide with the transmission by the access node 112.

Upon detecting the hidden node situation in block 402, the station 100 may transmit the spatial cooperation request to the access node (steps 202, 300). In this frame, the station may indicate parameters that may affect the decision made by the access node 112. The parameters may include, for example, a number of antennas in the station 100, capability of the station 100 to configure a reception null towards the access node 112, information on whether the spatial cooperation would require the access node 112 configuring a transmission null towards the station 100, and/or quality-of-service (QoS) parameters of the station. Any set of these parameters may be communicated in steps 202 and 300. For example, an information element in the spatial cooperation request may indicate whether the station will configure the null steering, the access node 112 is requested to configure the null steering, or both the station 100 and the access node 112 are indicated to perform the null steering.

In an embodiment, the station 100 transmits the spatial cooperation request only if the access node 112 has indicated in an information element of a beacon frame (or another broadcast frame or a signaling frame) that the access node 112 is allowing spatial cooperation.

Upon receiving the spatial cooperation request frame in step 302, the access node makes the decision about the spatial cooperation in block 406. Although the access node 112 may indicate willingness for the spatial cooperation in the beacon etc., it may still make case-by-case decisions. The access node may consider any one or more of the above-described parameters received in the spatial cooperation request when making the decision. For example, if the access node cannot establish any more transmission nulls and the station 100 indicates incapability for establishing a reception null, the access node 112 may reject the request. Upon making the decision, the access node 112 transmits the spatial cooperation response to the station in step 302, and the station 100 receives the frame in step 204. If the response is negative, the access node 112 may indicate it in the response frame. No spatial reuse will then be enabled. If the response is positive, the access node 112 may indicate it in the response frame and, optionally, include information for the spatial cooperation. Such information may include an information element indicating that the access node 112 shall facilitate acquisition of channel state information on a channel between the access node 112 and the station 100 for configuring the reception null towards the access node 112 in the station 100. Details of the acquisition are described below.

In an embodiment, the station 100 transmits, to the first access node after receiving the spatial cooperation response message, a spatial cooperation information frame comprising at least one information element indicating spatial cooperation between the station 100 and the access node 112. The frame informs the access node 110 of the hidden node situation and that the spatial cooperation has been enabled. The access node 110 may use information when scheduling downlink transmissions, for example. The spatial cooperation information frame may comprise an indication of whether or not the station 100 will use a reception null towards the access node 112 in the spatial cooperation. The access node 110 may use the information in configuring spatial directivity of transmissions towards the station 100. For example, if the station 100 uses a reception null, the spatial directions for reception are limited. As a consequence, the access node may limit a number and/or direction of spatial streams of downlink frame transmissions to the station 100. The access node 110 may store the spatial cooperation information contained in the spatial cooperation information frame in block 412.

Figure 5:
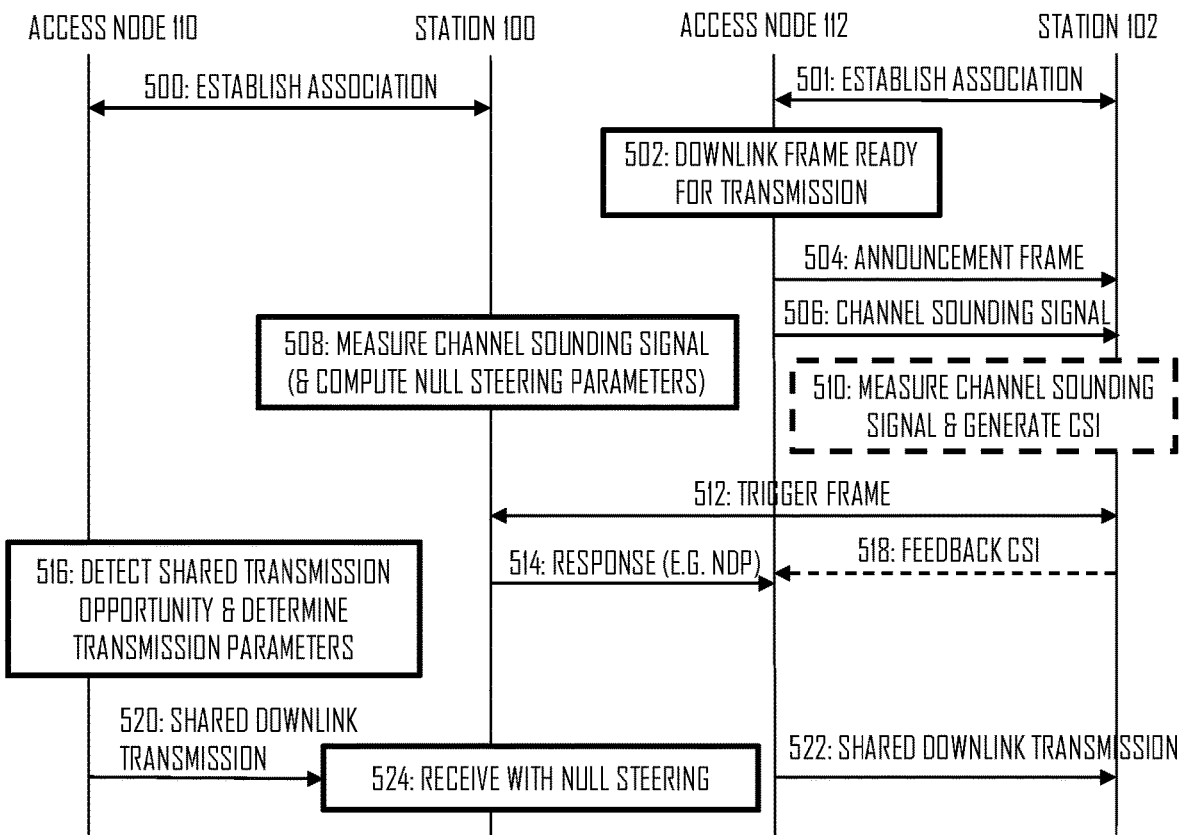
FIG. 5 illustrates a signalling diagram for spatial cooperation in a situation where a hidden node initiates downlink transmission according to an embodiment.
Figure 6:
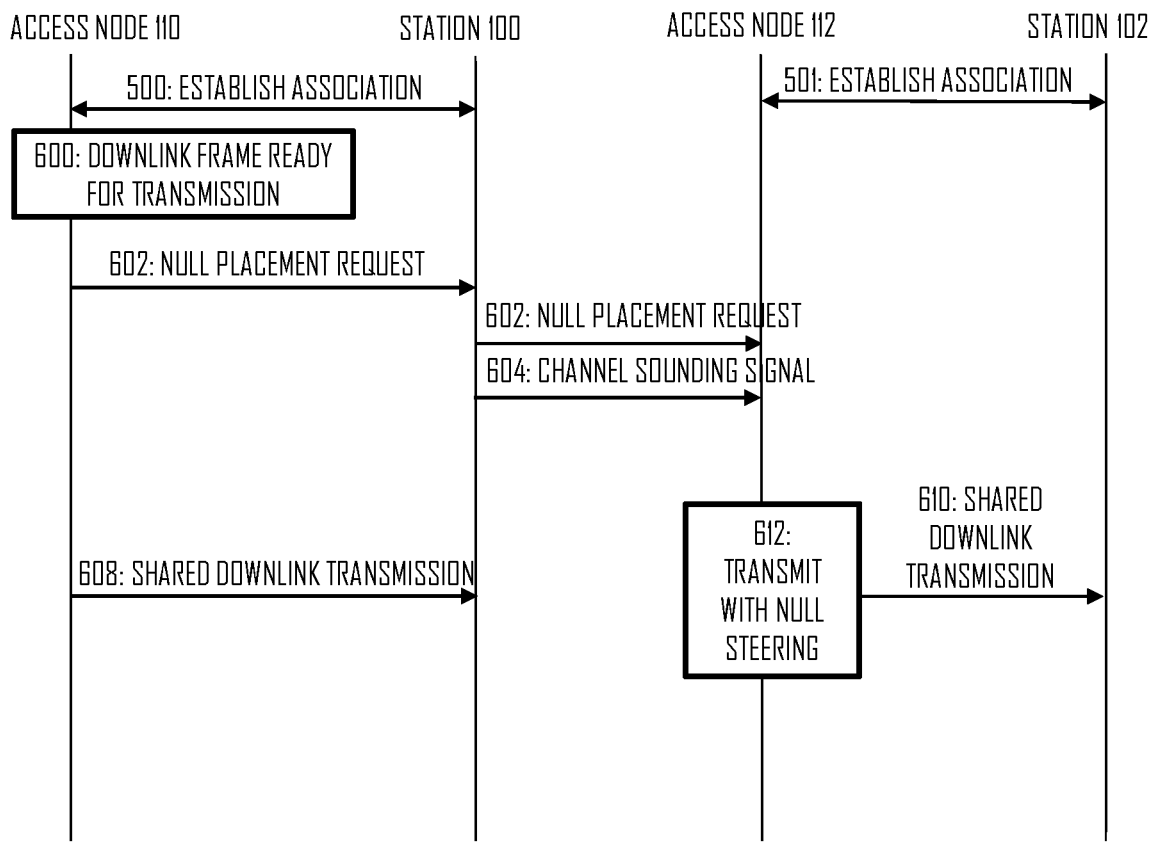
FIG. 6 illustrates a signalling diagram for spatial cooperation in a situation where an associated access node initiates downlink transmission according to an embodiment.
Figure 7:
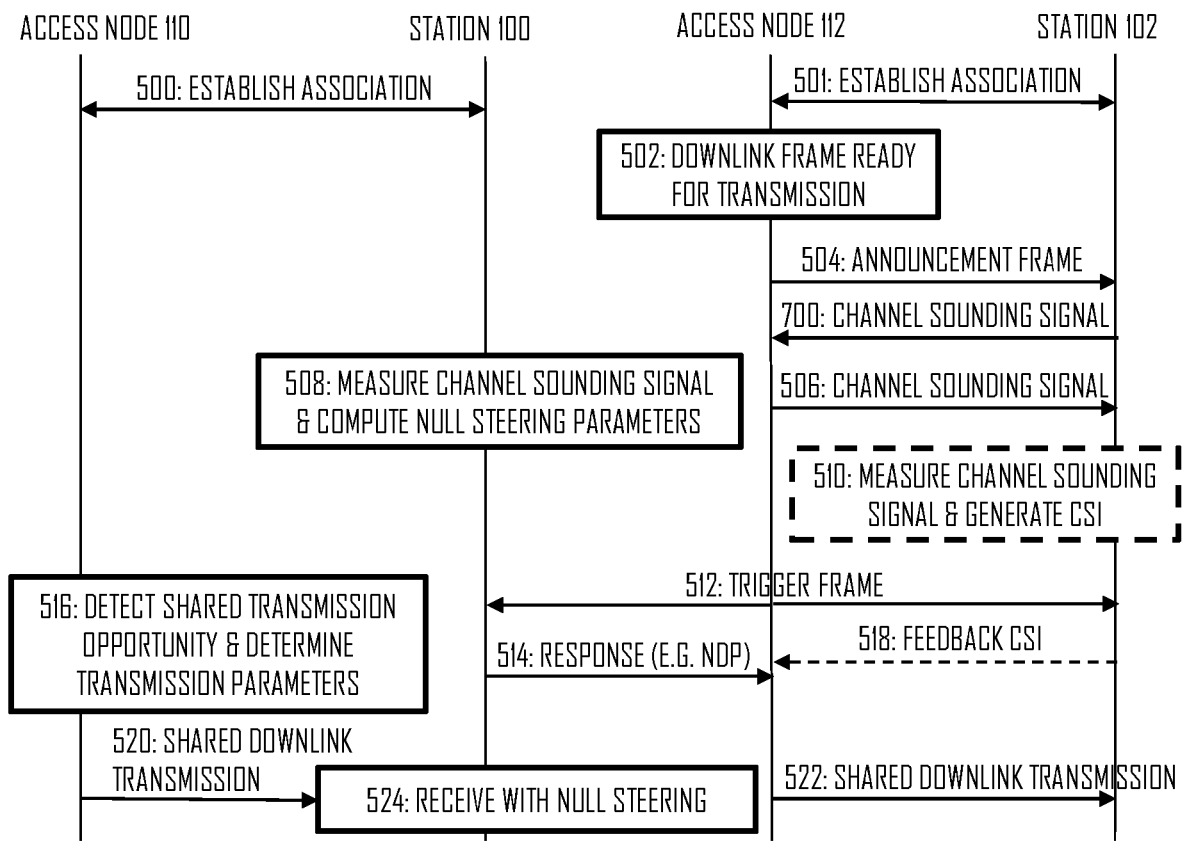
FIG. 7 illustrates a signalling diagram for spatial cooperation in a situation where a hidden node initiates downlink transmission according to another embodiment.

Let us then describe some embodiments of procedures during the spatial cooperation with reference to FIGS. 5 to 7. FIGS. 5 and 7 illustrate embodiments where the access node 112 is initiating downlink transmission and the station 100 configures the reception null towards the access node 112 during the spatial cooperation. In other words, any one of the embodiments of FIGS. 5 to 7 may follow the initiation of the spatial cooperation according to FIG. 4. FIG. 6 illustrates an embodiment where the access node 110 is initiating downlink transmission and the access node 112 configures the transmission null towards the station 100 during the spatial cooperation. The idea may be that the station 100 benefits from the spatial cooperation in the embodiment of FIGS. 5 to 7 and, thus, is responsible for the null steering. The same idea applies to the embodiment of FIG. 6 where the access node benefits from the spatial cooperation and is therefore responsible for arranging the null steering. The procedure of FIG. 5 or 7 may be carried out every time when the (hidden) access node 112 initiates the downlink transmission, while the procedure of FIG. 6 may be carried out every time when the access node 110 initiates the downlink transmission.

Referring to FIG. 5, the station 100 may associate to the access node 110 in step 500, and the station 102 may associate to the access node 112 in step 501. The setup of the spatial cooperation may be carried out when the station 100 detects the hidden access node during the association. For example, the setup according to the embodiment of FIG. 4 may be carried out after step 500 or even before step 500. Upon detecting a downlink frame ready for transmission in block 502, the access node 112 may initiate a channel sounding procedure for the spatial cooperation. In the channel sounding procedure, the access node 112 may transmit (step 504) an announcement frame indicating the station 102. The announcement frame may additionally indicate the unassociated station 100. The announcement frame may indicate that the access node intends to perform channel state information (CSI) acquisition with the station 102 (and 100). After transmitting the announcement frame, the access node 112 may transmit (step 506) a channel sounding signal. The station(s) 102, 100 may measure the channel sounding signal (blocks 508 and 510), as configured by the announcement frame and generate the CSI. Upon generating the CSI, at least the stations 102 may transmit (step 518) a beamforming report comprising the CSI.

Steps 510 and 518 may be omitted, if the access node performs no null steering or spatial multiplexing, e.g. if only the station 100 is performing the null steering. In such a case, the purpose of the trigger frame may be to only facilitate or enable the spatial reuse. The trigger frame may then be addressed only to the station 100. The station 102 detecting the trigger frame addressed to the station 100 may then skip step 518. The station 102 may also skip computation of the CSI, for example. If the access node 112 intends to use transmission null steering and/or spatial multiplexing, the access node may address the trigger frame to the station 102 and, optionally to the station 100. As a consequence, the station 102 may carry out the CSI reporting and the station 100 may detect the opportunity for the spatial reuse.

In an embodiment where the spatial cooperation involves only the null steering in the reception by the station, the access node 112 may carry out the downlink frame transmission in a conventional manner because no special actions are needed of it during the spatial cooperation.

In an embodiment, the channel sounding signal is addressed only to the station 102. Since the station 100 has, however, configured to spatial cooperation with the access node 112, the station 100 may also detect and measure the channel sounding signal transmitted by the access node 112 in step 506.

In an embodiment, the transmission of the beamforming report in step 518 is subjected to the access node 112 that transmitted the channel sounding signal transmitting a trigger frame (step 512) that triggers the transmission of the beamforming report in step 518.

In an embodiment, the announcement frame transmitted in step 504 is a null data packet announcement (NDPA) frame of 802.11 specifications. The NDPA frame may indicate stations from which the access node requests channel state information (CSI) and contains information on the requested CSI. In an embodiment, the announcement frame indicates at least one station from the network of the access node 112 transmitting the announcement frame and at least one station from the network of the other access node 110. Below, an example of the NDPA frame is illustrated:

| Control | Duration | RA | TA | Sounding Dialog Token | STA1 | ... | STA N | FCS |
|---|---|---|---|---|---|---|---|---|
| 2 | 2 | 6 | 6 | 1 | 4 | | 4 | 4 |

The number below each item represents the length of the respective item in octets. Frame Control field specifies the type of the frame, and Duration field specifies the duration of the frame. RA is a receiver address, and TA is a transmitter address. The RA may be a medium access control (MAC) address of a target station in case of unicast transmission, or it may be a broadcast address. When the frame is targeted only to the stations associated to the access node 112, the TA may be a MAC address of the access node 112. When the frame is targeted to one or more unassociated stations, the TA field may comprise a SSID of the access node 112, i.e. an identifier of the wireless network of the access node 112. Alternatively, the TA field may comprise the MAC address of the access node 112 when the frame is targeted to one or more unassociated stations. The Sounding Dialog Token may announce that the frame is a high-efficiency (HE) NDPA frame. The STA1 to STA N fields may identify the N stations that are requested to perform the channel sounding measurements. The stations may comprise stations associated to the access node 112 and/or stations not associated to the access node 112. The table below illustrates an embodiment of contents of the field STA N. Frame Check Sequence (FCS) may be used for error detection/correction.

| AID11 | Partial BW Information | Feedback Type & Ng | Disambiguation | Codebook Size | Nc |
|---|---|---|---|---|---|
| 11 | 14 | 2 | 1 | 1 | 3 |

The number below each item represents the length of the respective item in bits. AID11 contains the least significant bits of an association identifier of the station identified by the field. In this case, 11 least significant bits is used but the number of bits may be different. Partial bandwidth (BW) information field may be used to specify a measurement band in terms of resource units. Disambiguation bit may be set to value '1' for a HE frame. The Feedback Type & Ng and Codebook size sub-fields define the type of channel state information to be determined, such as quantization resolution, single-user/multi-user feedback type, and precoding codebook size.

In an embodiment, the channel sounding signal is a null data packet (NDP) of 802.11 specifications. In an embodiment where the announcement frame is the NDPA frame and the channel sounding signal the NDP, the NDP may be transmitted a short inter-frame space (SIFS) after the NDPA frame. The NDP may carry no payload, i.e. no data field. It may yet comprise training sequence fields to enable the channel measurements and, additionally, one or more signalling fields.

Upon transmitting the channel sounding signal, the access node 112 may transmit the trigger frame (step 512) indicating a transmission period for the downlink frame transmission and/or requesting at least the station 102 to send the measured CSI to the access node 112. The trigger frame may serve as an indication of a shared transmission opportunity for the station 100. The trigger frame may cause the station 102 to respond with a beamforming report comprising the measured CSI (step 518). The detection of the trigger frame may be understood by the station 110 as an indication of the shared transmission opportunity and, as a consequence, the station 100 may indicate to the access node 100 that a concurrent downlink transmission can be commenced. The access node 112 may thus use the trigger frame for indirectly communicating to the access node 110 that a downlink transmission within the spatial cooperation is commencing.

The station 100 may respond to the trigger frame received in step 512 by transmitting a response frame in step 514. In an embodiment, the response frame is a null data packet (NDP). In this embodiment, the station 100 may configure the reception null towards the access node. In another embodiment, the response frame comprises the CSI measured in block 508, and the access node may use the CSI for configuring a transmission null towards the station 100.

In a similar manner, the station 102 may respond to the trigger frame received in step 512 by transmitting a response frame in step 518. In an embodiment, the response frame is a null data packet (NDP). In this embodiment, access node may perform no transmission null steering. In another embodiment, the response frame comprises the CSI measured in block 508, and the access node 112 may use the CSI for configuring a transmission beam towards the station 102.

The access node 110 may detect the response frame transmitted in step 514 and implicitly understand that the access node 112 is about to perform a downlink data transmission within the spatial cooperation. The detection may be based on detecting that the response frame is addressed to the access node 112 with which the spatial has been confirmed and also indicated to the access node in the procedure of FIG. 4, for example. As a result, the access node 110 may take advantage of the information and prepare a concurrent downlink transmission to the station 100 (block 516). The access node 110 may also determine transmission parameters on the basis of the detected response frame. For example, if the response frame is the NDP, the access node 110 may determine that the station 100 is performing the null steering and limit the spatial streams used in the downlink transmission. On the other hand, if the response frame contains the CSI, the access node 110 may determine that the hidden access node 112 is carrying out the null steering and configure less limited spatial streams to the station 110.

If the station 100 performs the null steering, the station 100 may compute null steering parameters on the basis of the measured CSI in block 508.

In steps 520 and 522, the access nodes 110, 112 perform the downlink frame transmissions concurrently, and the station 100 is capable of receiving the downlink frame from the access node 110, thanks to the null steering (block 524).

Let us next describe the embodiment where the access node 110 is initiating the downlink transmission and, as a consequence, the access node 112 arranges a concurrent transmission within the spatial cooperation. In this embodiment, the station transmits, to the access node 112 before receiving the frame from the first access node 110, a null coordination frame comprising at least one information element requesting for null steering between the station 100 and the access node 112, thus informing the access node 112 of the shared transmission opportunity.

Referring to FIG. 6, the access node 110 determines in block 600 that a downlink frame addressed to the station 100 is ready for transmission. As a consequence, the access node 110 transmits a null placement request frame to the station in step 602 to request for null steering to protect the transmission of the downlink frame. It also indicates the shared transmission opportunity available to the access node 112. Upon receiving the null placement request in step 602, the station 100 may transmit, to the access node 112, a null placement request frame requesting the second access node 112 to arrange a transmission null towards the station 110 (step 602).

In connection with transmitting the null placement request frame to the access node in step 602, the station 100 may transmit a channel sounding signal (step 604) for enabling the access node to measure the channel between the station 100 and the access node 112. The channel sounding signal may be transmitted in the null placement request frame in step 602, or it may be transmitted in a separate frame. The access node 112 may then measure the channel sounding signal and determine a null steering configuration for establishing a transmission null towards the station 100. Thereafter, the access nodes 110, 112 may perform the concurrent downlink frame transmissions in steps 608 and 610, wherein the access node performs the transmission with null steering such that the transmission null is directed towards the station 100.

In an embodiment, the access node may acknowledge the null placement request frame received in step 602 by transmitting a null placement response frame acknowledging the null placement request. The null placement response frame may trigger the transmission of the channel sounding signal in step 604. In an embodiment, the null placement response frame is the above-mentioned trigger frame described in connection with step 512, for example.

If the station 100 has up-to-date CSI available towards the access node 112, the station 100 may also, or alternatively, determine to configure a reception null towards the access node 112.

Let us then summarize the embodiments of FIGS. 4 to 6 with respect to the embodiments of FIGS. 2 and 3. As described above in connection with FIG. 4, the spatial cooperation request and associated response may be transmitted when setting up the spatial cooperation before an actual shared transmission opportunity appears. In other embodiments, the setup of FIG. 4 may be omitted and, in such embodiments, the null placement request may be understood as an embodiment of the spatial cooperation request of step 202 and 300. The response to the null placement request may similarly construe an embodiment of the spatial cooperation response of step 204 and 302.

The embodiment of FIG. 5 employs a channel sounding procedure where the access node 112 transmits the announcement frame and associated channel sounding signal to enable both stations 100, 102 to measure the CSI of the channel towards the access node 112. This procedure may be called explicit CSI acquisition. Some systems may employ so-called implicit CSI acquisition where the access node triggers uplink transmission of a channel sounding signal with the announcement frame. When applying the implicit CSI acquisition, the access node 112 does not transmit the channel sounding signal in the conventional procedure and, as a consequence, the station 100 cannot measure the CSI.

FIG. 7 illustrates an embodiment where the CSI measurements by the station 100 are enabled in the context of the implicit CSI acquisition. In FIG. 7, the functions denoted by the same reference numbers as in FIG. 5 represent the same or substantially similar functions. Referring to FIG. 7, upon transmitting the announcement frame 504 in step and, thus, triggering the uplink transmission of the channel sounding signal (step 700), the access node 112 may additionally transmit a downlink channel measurement signal (step 506) after the announcement frame to enable the station 100 to measure the downlink channel sounding signal (block 508). The channel sounding signal transmitted in step 506 may be addressed to the station 100 or, alternatively, to the station 102. In either case, the station 100 may measure the channel sounding signal.

Figure 8:
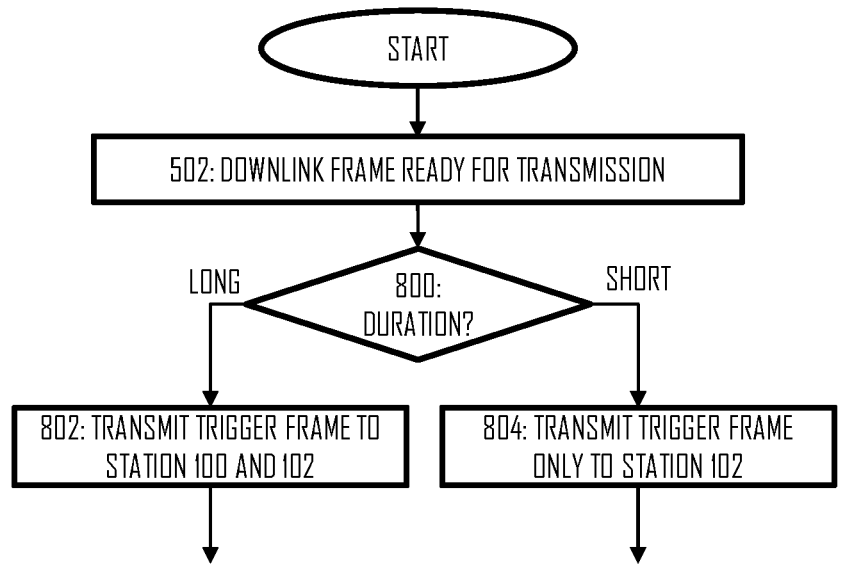
FIG. 8 illustrates a flow diagram of a decision process for determining whether or not to employ spatial cooperation according to an embodiment.

In an embodiment, although acknowledging the spatial cooperation with the station 100, the access node 112 may employ the spatial cooperation for only some downlink frames it transmits. FIG. 8 illustrates an embodiment for determining when to use the spatial cooperation in the downlink transmission. Referring to FIG. 8, upon detecting that one or more downlink frames are ready for transmission to the station 102 (block 502), the access node 112 may determine length or duration of the downlink transmission, e.g. in terms of milliseconds or in a number of downlink frames to be transmitted. If it is determined in block 800 that the duration (or length) of the downlink transmission is above a threshold, the access node 112 may trigger the spatial cooperation and address the trigger frame to both stations 100, 102. Thereafter, the process may proceed according to the embodiment of FIG. 5 or 7, for example. Accordingly, the station 100 may respond to the trigger frame and, thus, inform the access node 110 of the shared transmission opportunity. On the other hand, if it is determined in block 800 that the duration (or length) of the downlink transmission is below the threshold, the access node 112 may disable the spatial cooperation and address the trigger frame only to the station 102. Thereafter, the process may proceed as a conventional downlink transmission without the spatial cooperation. Accordingly, the station 100 does not respond to the trigger frame and, thus, the access node 110 determines that there is no shared transmission opportunity available. If the duration is considered short, the access node 112 may determine that the risk for a collision is marginal and, therefore, avoid the additional signalling related to the spatial cooperation.

Figure 9:
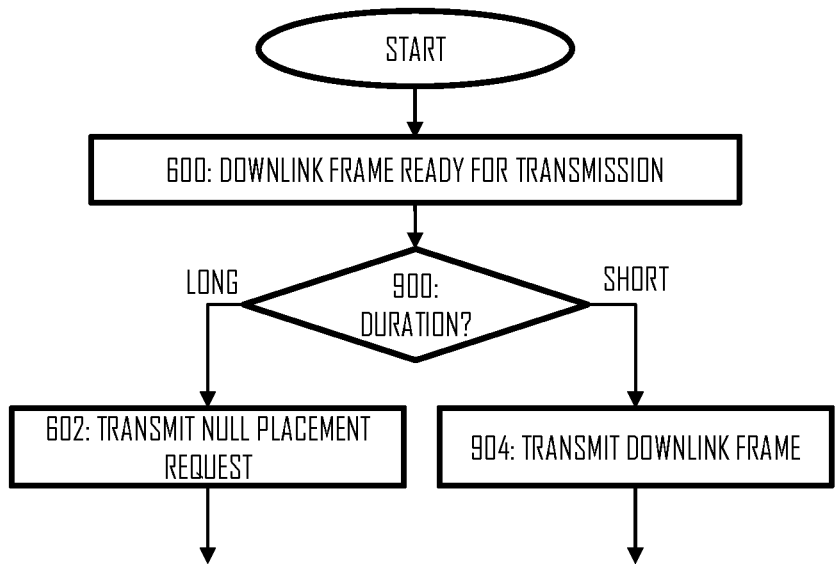
FIG. 9 illustrates a flow diagram of a decision process for determining whether or not to request for spatial cooperation according to an embodiment.

A similar procedure may be formed for the access node 110 and employed in connection with the embodiment of FIG. 6, for example. FIG. 9 illustrates an embodiment for determining when to request for the spatial cooperation in the downlink transmission by the access node 110. Referring to FIG. 9, upon detecting that one or more downlink frames are ready for transmission to the station 100 (block 600), the access node 110 may determine length or duration of the downlink transmission, e.g. in terms of milliseconds or in a number of downlink frames to be transmitted. If it is determined in block 900 that the duration (or length) of the downlink transmission is above a threshold, the access node 110 may trigger the request for spatial cooperation and transmit the null placement request (block 602). Thereafter, the process may proceed according to the embodiment of FIG. 6, for example. Accordingly, the station 100 may forward the null placement request to the access node 112. On the other hand, if it is determined in block 900 that the duration (or length) of the downlink transmission is below the threshold, the access node 110 may disable the spatial cooperation request and transmit a conventional the trigger frame or another frame that triggers the downlink transmission without the spatial cooperation. Thereafter, the process may proceed as a conventional downlink transmission without the spatial cooperation. Accordingly, the station 100 does not forward the null placement request and, thus, the access node 112 determines that there is no shared transmission opportunity available.

Instead of, or in addition to, the duration or length of the transmission, the access node 110 or 112 may use in block 800/900 another criterion or criteria, e.g. a reliability requirement or a QoS classification of the frame being transmitted. If the reliability requirement is low, e.g. below a threshold, the process may proceed to block 804, 904 and reduce signalling overhead with the increased risk of a collision. If the reliability requirement is high, e.g. above the threshold, the process may proceed to block 802, 902 and improve the reliability of the frame transmission.

Figure 10:
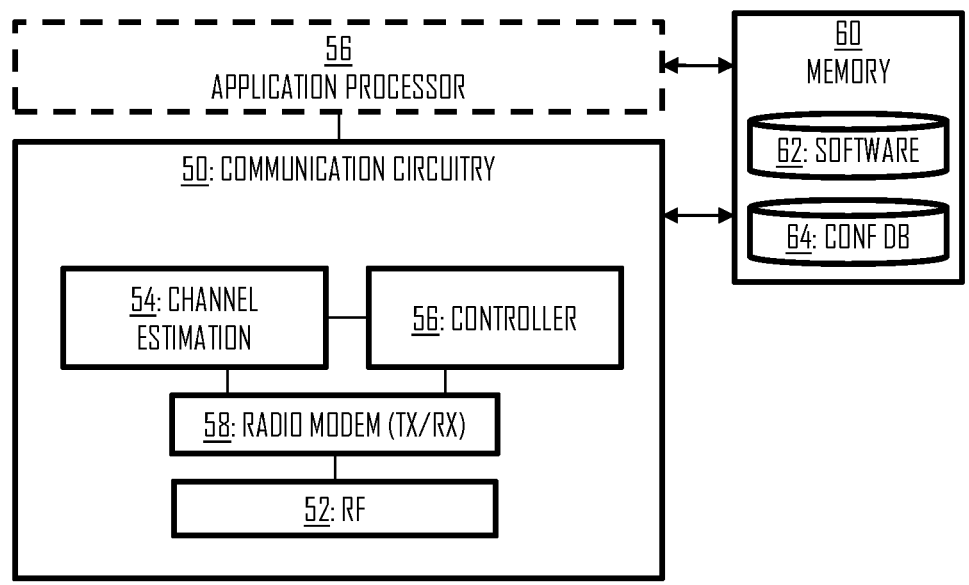
FIGS. 10 and 11 illustrate block diagrams of structures of apparatuses according to some embodiments of the invention.

FIG. 10 illustrates an embodiment of a structure of the above-mentioned functionalities of an apparatus executing the functions of the station 100 in the process of FIG. 2 or any one of the embodiments described above for the station 100. The apparatus may be a terminal device, a peer device, or a client device of a wireless network, e.g. the 802.11 network. In other embodiments, the apparatus may be a circuitry or an electronic device realizing some embodiments of the invention in such a wireless device. The apparatus may comply with 802.11 specifications. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention.

Referring to FIG. 10, the apparatus may comprise a communication circuitry 50 providing the apparatus with capability of communicating in the wireless network of the access node 110. The communication circuitry 50 may comprise a radio interface 52 providing the apparatus with radio communication capability. The radio interface 52 may comprise radio frequency converters and other radio frequency components such as an amplifier, filter, and frequency-converter circuitries and one or more antennas. The communication circuitry 50 may further comprise a radio modem 58 configured to carry out transmission and reception of messages in the wireless network and with an access node of a wireless network to which the apparatus is not associated, e.g. the access node 112. The radio modem 58 may comprise encoder and decoder circuitries, modulator and demodulator circuitries, etc.

The communication circuitry 50 may further comprise a channel estimation circuitry 54 configured to measure a signal strength from a received radio signal and to determine other channel state information such as precoding parameters for forming spatial transmission and/or reception nulls by using beamforming, as described above. The channel estimation circuitry 54 may be configured to measure the channel sounding signal received in step 506 and to generate the channel state information to be transmitted in step 514, for example.

The communication circuitry 50 may further comprise a controller 56 configured to control transmissions and functions of the apparatus. The controller 56 may, for example, control the establishment of the association in step 400 or 500, to control the channel estimation circuitry 54 to perform the channel estimation for a signal received from an unassociated access node, and to control the radio modem to communicate with the unassociated access node(s), e.g. as described above in connection with any one or more of steps 202, 204, 506, 512, 514, 602, and 604, for example. The communication controller 50 may comprise at least one processor comprising the controller 56 and the channel estimation circuitry 54 and, optionally, at least some of the circuitries of the radio modem 58.

In at least the embodiments where the apparatus executes functions of the station 100, the apparatus may further comprise an application processor 56 executing one or more computer program applications that generate a need to transmit and/or receive data through the communication circuitry 50. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

The apparatus may further comprise a memory 60 storing one or more computer program products 62 configuring the operation of said processor(s) of the apparatus. The memory 60 may further store a configuration database 64 storing operational configurations of the apparatus. The configuration database 64 may, for example, store an identifier of the unassociated access node with which the spatial cooperation has been established, e.g. according to the embodiment of FIG. 4. The configuration database may store the CSI towards the unassociated access node.

Figure 11:
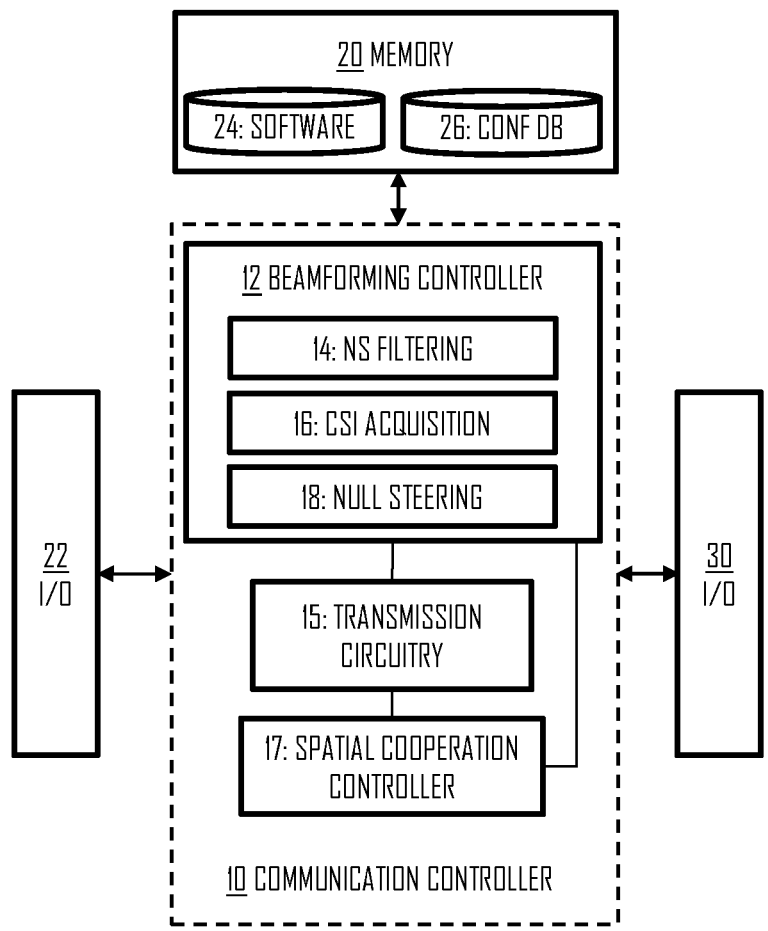

FIG. 11 illustrates an embodiment of a structure of the above-mentioned functionalities of an apparatus executing the functions of the access node 112 in the process of FIG. 3 or any one of the embodiments described above for the access node 112. The access node 110 may have a similar structure in the sense that the access node 110 may be configured with the same capabilities for spatial cooperation as the access node 112. In the same manner, the access node 112 may have the capabilities of the access node 110 in a scenario where the roles were switched, e.g. the access node 110 would be a hidden node interfering a station associated to the access node 112. In an embodiment, the apparatus is the access node 112. In another embodiment, the apparatus carrying out the above-described functionalities of the access node 112 is comprised in such a device, e.g. the apparatus may comprise a circuitry, e.g. a chip, a chipset, a processor, a micro controller, or a combination of such circuitries in the access node. The apparatus may be an electronic device comprising electronic circuitries for realizing some embodiments of the access node.

Referring to FIG. 11, the apparatus may comprise a first communication interface 22 or a communication circuitry configured to provide the apparatus with capability for bidirectional communication with stations and other access nodes over a radio interface. The communication interface 22 may comprise radio frequency circuitries for processing received control frames and data frames and control frames and data frames to be transmitted. The communication interface 22 may comprise circuitries for processing messages described above in connection with one or more of the steps 300 to 304, 501, 504, 506, 512, 514, 518, 522, 602, 604, 610, 700. The communication interface 22 may comprise standard well-known components such as an antenna array, amplifier, a filter, a frequency converter, and encoder/decoder circuitries.

The apparatus may further comprise a second communication interface 30 or a communication circuitry configured to provide the apparatus with capability for bidirectional communication with other networks, e.g. the Internet or another computer network. The communication interface 30 may comprise standard well-known components such as an amplifier, a filter, and encoder/decoder circuitries.

The apparatus may further comprise a memory 20 storing one or more computer program products 24 configuring the operation of at least one processor 10 of the apparatus. The memory 20 may further store a configuration database 26 storing operational configurations of the apparatus, e.g. information on stations with which spatial cooperation has been configured, channel state information towards such stations.

The apparatus may further comprise the at least one processor 10 configured to carry out the process of FIG. 3 or any one of its embodiments. The processor may comprise a communication controller 10 controlling the operation of the access node. The communication controller may be realized by one or more processors. Referring to FIG. 11, the processor(s) 10 comprise(s) a spatial cooperation controller 17, a beamforming controller 12 and a transmission circuitry 15. The transmission circuitry 15 may carry out frame transmissions in a wireless network managed by the apparatus. The frame transmissions may include transmissions of frames to stations associated to the apparatus in which case the transmission circuitry may employ transmission null steering, as described in some embodiments above, e.g. in connection with steps 522, 612. The frame transmissions may include the setup of the spatial cooperation, as described above in connection with FIG. 4. For transmitting at least some messages during the setup of the spatial cooperation, the transmission circuitry 15 may employ a beamforming configuration that does or does not use the null steering, e.g. omnidirectional transmission.

The spatial cooperation controller may control the procedure of FIG. 4 in the access node 112, or carry out the process of FIG. 8. With respect to FIG. 4, the spatial cooperation controller 17 may, for example, make the decision about the spatial cooperation in block 406 and control the transmission circuitry 15 to transmit appropriate frame(s) according to the decision. The spatial cooperation controller 17 may also control the transmission circuitry 15 and the beamforming controller during the operation of embodiments of FIGS. 5 to 7.

The beamforming controller 12 may comprise a null steering filtering circuitry 14 configured to carry out the process of FIG. 7 in order to determine devices that are in a need for directing a transmission null towards them. For the generation of the beamforming configuration, the beamforming controller 12 may comprise a channel state information (CSI) acquisition circuitry 16 configured to select stations to be involved in the CSI acquisition, control the CSI acquisition and transmission of the announcement frame(s), the channel sounding signals, and measurement of uplink channel sounding signals. Upon determining the CSIs for stations needing a transmission null, a null steering circuitry 18 may compute the beamforming configuration such that transmission null(s) is/are directed towards unassociated stations that need the null steering and transmission energy is directed towards associated stations to which transmission/reception occurs. The null steering circuitry 18 may then store the beamforming configuration in the configuration database 26.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 9 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising:
   at least one processor; and
   at least one memory storing instructions that, when executed by the at least one processor, cause the apparatus at least to:
   detect that a second access node of a second wireless network is hidden to a first access node of a first wireless network;
   in response to the detecting that the second access node is hidden to the first access node, transmit a message to the second access node;
   wherein the message transmitted to the second access node comprises at least one parameter configured to request that spatial cooperation to be performed;
   wherein the at least one parameter comprises a number of one or more antennas of the apparatus;
   receive, from the second access node a response message comprising at least one information element acknowledging that spatial cooperation is to be performed; and
   subsequent to receiving from the second access node the response message acknowledging that spatial cooperation is to be performed, receive a frame from the first access node while null steering is performed between the apparatus and the second access node;
   wherein the apparatus is configured to operate in the first wireless network.

2. The apparatus of claim 1 further configured to transmit, to the second access node before receiving the frame from the first access node, a null coordination frame comprising at least one information element requesting for null steering between the apparatus and the second access node, wherein the at least one information element of the null coordination frame comprises a request for the second access node to arrange a transmission null towards the apparatus, wherein the request is provided in response to detecting that the first access node is intending to transmit the frame to the apparatus.

3. The apparatus of claim 1, wherein the response message received from the second access node comprises an indication that null steering is to be performed between the apparatus and the second access node.

4. The apparatus of claim 1, wherein the at least one parameter additionally comprises quality of service parameters of the apparatus.

5. The apparatus of claim 1, wherein the at least one parameter additionally comprises a capability of the apparatus to configure a reception null towards the second access node.

6. The apparatus of claim 1, wherein the at least one parameter additionally comprises an indication requesting the second access node to configure a transmission null towards the apparatus to implement the spatial cooperation.

7. The apparatus of claim 1, wherein the at least one parameter additionally comprises an indication that the apparatus is to configure a reception null towards the second access node to implement the spatial cooperation.

8. The apparatus of claim 1, wherein the message transmitted to the second access node is a spatial cooperation request message.

9. The apparatus of claim 1 further configured to:
   perform the null steering by arranging a reception null towards the second access node; and
   in response to detecting that the second access node is intending to transmit a frame, arrange the reception null towards the second access node.

10. The apparatus of claim 9 further configured to perform channel measurements on a channel sounding signal received from the second access node before receiving the frame and to configure the reception null on the basis of the channel measurements.

11. The apparatus of claim 10, wherein the channel sounding signal is addressed to an apparatus other than the apparatus.

12. The apparatus of claim 1, wherein the null steering being performed between the apparatus and the second access node is based on:
   the apparatus requesting for the second access node to arrange a transmission null towards the apparatus, or
   the apparatus arranging a reception null towards the second access node.

13. The apparatus of claim 1 further configured to transmit, to the first access node after receiving the response message, a spatial cooperation information frame comprising at least one information element indicating spatial cooperation between the apparatus and the second access node, wherein the at least one information element of the spatial cooperation information frame transmitted by the apparatus to the first access node having a signal desired by the apparatus indicates a configuration of null steering to be performed between the apparatus and the second access node that is interfering with the apparatus, wherein the apparatus comprises a first station connected to the first access node.

14. The apparatus of claim 1 further configured to receive, before receiving the frame from the first access node, a trigger frame from the second access node, and to transmit to the second access node a response message responding to the trigger frame and informing the first access node of the null steering during the reception of the frame, wherein the response message comprises a configuration of a reception null towards the second access node, or the response message comprises channel state information measured by the apparatus, the channel state information configured to be used with the second access node for configuration of a transmission null towards the apparatus.

15. The apparatus of claim 1, wherein the instructions, when executed by the at least one processor, cause the apparatus at least to:

receive, from the second access node, an indication of a transmission period comprising at least a duration of the spatial cooperation to be performed between the apparatus and the second access node;

wherein the null steering is performed between the apparatus and the second access node during the transmission period comprising at least the duration of the spatial cooperation to be performed between the apparatus at the second access node.

16. An apparatus comprising:

at least one processor; and at least one memory storing instructions that, when executed by the at least one processor, cause the apparatus at least to:

receive a message from a first station associated to a second access node of a second wireless network;

wherein the message received from the first station comprises at least one parameter configured to request spatial cooperation to be performed;

wherein the at least one parameter comprises a number of one or more antennas of the first station;

determine that spatial cooperation is to be performed, based on the at least one parameter;

transmit, to the first station a response message comprising at least one information element acknowledging that spatial cooperation is to be performed; and in response to transmitting to the first station the response message acknowledging that spatial cooperation is to be performed, transmit a frame to a second station associated to a first access node of a first wireless network while the null steering is performed between the apparatus and the first station, wherein the apparatus comprises the first access node.

17. The apparatus of claim 16 further configured to:

receive, from the first station, a null coordination frame comprising at least one information element requesting for null steering between the apparatus and the first station;

wherein the at least one information element of the null coordination frame comprises a request for the apparatus to arrange a transmission null towards the first station.

18. The apparatus of claim 16, wherein the null steering being performed between the apparatus and the first station is based on:

the apparatus arranging a transmission null towards the first station, or a reception null arranged towards the apparatus from the first station.

19. The apparatus of claim 16 further configured to:

as a response to the null coordination frame, transmit a channel sounding signal addressed to either the first station or the second station;

receive, when the channel sounding signal is addressed to the first station, at least one channel sounding signal measurement from the first station; and configure a transmission null towards the first station, based on the at least one channel sounding signal measurement received from the first station.

20. The apparatus of claim 19, further configured to:

receive, when the channel sounding signal is addressed to the second station, at least one channel sounding signal measurement from the second station; and configure a transmission beam towards the second station, based on the at least one channel sounding signal measurement received from the second station.

21. The apparatus of claim 16, wherein the response message comprises an indication that the apparatus intends to acquire channel state information on a channel between the apparatus and the first station, wherein the channel state information is used to configure the null steering between the apparatus and the first station.

22. The apparatus of claim 15, wherein the at least one parameter additionally comprises at least one of:

a capability of the first station to configure a reception null towards the apparatus, or an indication comprising a request for the apparatus to configure a transmission null towards the first station to implement the spatial cooperation, or an indication that the first station is to configure a reception null towards the apparatus to implement the spatial cooperation, or quality of service parameters of the first station.

23. A method comprising:

detecting, by a station of a first wireless network connected to and under a coverage of a first access node, that a second access node of a second wireless network is hidden to the first access node;

in response to detecting that the second access node is hidden to the first access node, transmitting by the station a message to the second access node;

wherein the message transmitted to the second access node comprises at least one parameter configured to request spatial cooperation to be performed;

wherein the at least one parameter comprises a number of one or more antennas of the station;

receiving, by the station from the second access node a response message comprising at least one information element acknowledging that spatial cooperation is to be performed; and in response to receiving from the second access node the response message acknowledging that spatial cooperation is to be performed, receiving by the station a frame from the first access node while null steering is performed between the station and the second access node.

24. The method of claim 23, wherein the station transmits, to the second access node before receiving the frame from the first access node, a null coordination frame comprising at least one information element requesting for null steering between the station and the second access node, wherein the at least one information element of the null coordination frame requests for the second access node to arrange a transmission null towards the station, wherein the station requests, in response to detecting that the first access node is intending to transmit the frame to the station, for the second access node to arrange the transmission null towards the station.

25. The method of claim 23, wherein:

the station is connected to and under the coverage of the second access node; and the frame is received by the station connected to the first access node from the first access node while the second node is transmitting another frame to another station that is not connected to or under the coverage of the first access node.

26. The method of claim 23, wherein the station performs the null steering by arranging a reception null towards the second access node.

* * * * *